(12) United States Patent
Iwamoto

(10) Patent No.: US 7,043,571 B2
(45) Date of Patent: May 9, 2006

(54) CONTROLLED DEVICE, CONTROLLER, INFORMATION CONTROL CENTER, INITIALIZATION-ALLOWING COMMUNICATION SYSTEM, AND COMMUNICATION CONTROL SYSTEM AND MEDIUM

(75) Inventor: Koji Iwamoto, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 313 days.

(21) Appl. No.: 10/409,211

(22) Filed: Apr. 8, 2003

(65) Prior Publication Data

US 2003/0191543 A1    Oct. 9, 2003

Related U.S. Application Data

(62) Division of application No. 09/160,766, filed on Sep. 24, 1998, now Pat. No. 6,584,364.

(30) Foreign Application Priority Data

Sep. 25, 1997 (JP) ................................. 9-260708

(51) Int. Cl.
  *G06F 3/00* (2006.01)
(52) U.S. Cl. .......................... 710/14; 710/13; 710/38; 700/9; 700/19; 709/212; 709/226; 370/389; 707/10
(58) Field of Classification Search ................ 700/2–4, 700/9–11, 19, 20; 707/1, 10; 710/3–7, 22–28, 710/8, 14–16, 36, 38, 52; 709/212, 223, 709/226, 250; 370/351, 389
See application file for complete search history.

(56) References Cited

U.S. PATENT DOCUMENTS

| | | | |
|---|---|---|---|
| 4,910,765 A |   | 3/1990 | Matsuse et al. |
| 4,926,665 A | * | 5/1990 | Stapley et al. ................. 70/277 |
| 5,131,087 A | * | 7/1992 | Warr ........................... 711/113 |
| 5,172,109 A |   | 12/1992 | Saini et al. |
| 5,325,505 A | * | 6/1994 | Hoffecker et al. ........... 707/101 |
| 5,487,100 A |   | 1/1996 | Kane |
| 5,539,880 A | * | 7/1996 | Lakhani ....................... 375/257 |
| 5,544,036 A |   | 8/1996 | Brown, Jr. et al. |

(Continued)

FOREIGN PATENT DOCUMENTS

EP        0457940        11/1991

(Continued)

OTHER PUBLICATIONS

Partial European Search Report dated Aug. 17, 2000, application no. EP98117651.

*Primary Examiner*—Anthony Knight
*Assistant Examiner*—Crystal J Barnes
(74) *Attorney, Agent, or Firm*—RatnerPrestia

(57) ABSTRACT

An initialization-allowing communication system is constituted with devices 70 and 80, a controller 400 for controlling the devices 70 and 80 through communication, and so on. Each device and the controller 400 are provided with communication means 31, a house code showing a setting place, a subsystem ID showing the ID of a subsystem in a set system, a device ID showing the type of device, and self-address setting-holding means 11 for holding a self-address constituted with a device number showing a device number and the controller 400 is further provided with system structure holding means 301 for holding the information concerned with the system structure to be controlled and a communication-counterpart-address setting-holding means 401 for setting and holding the address of a counterpart to be communication-controlled obtained from the information concerned with the system structure.

10 Claims, 15 Drawing Sheets

U.S. PATENT DOCUMENTS

| | | |
|---|---|---|
| 5,548,782 A | 8/1996 | Michael et al. |
| 5,572,438 A | 11/1996 | Ehlers et al. |
| 5,621,662 A | 4/1997 | Humphries et al. |
| 5,661,806 A | 8/1997 | Nevoux et al. |
| 5,732,074 A * | 3/1998 | Spaur et al. ............... 370/313 |
| 5,770,811 A * | 6/1998 | Haino ...................... 84/464 R |
| 5,875,430 A * | 2/1999 | Koether ......................... 705/1 |
| 5,909,430 A | 6/1999 | Reaves |
| 5,938,741 A * | 8/1999 | Itoh et al. ..................... 710/6 |
| 5,996,030 A * | 11/1999 | Ofer ............................ 710/19 |

FOREIGN PATENT DOCUMENTS

| | | |
|---|---|---|
| EP | 0606817 | 7/1994 |
| GB | 2309567 | 7/1997 |
| JP | 5-276178 | 10/1993 |
| JP | 11175626 A * | 7/1999 |
| JP | 2000047925 A * | 2/2000 |

* cited by examiner

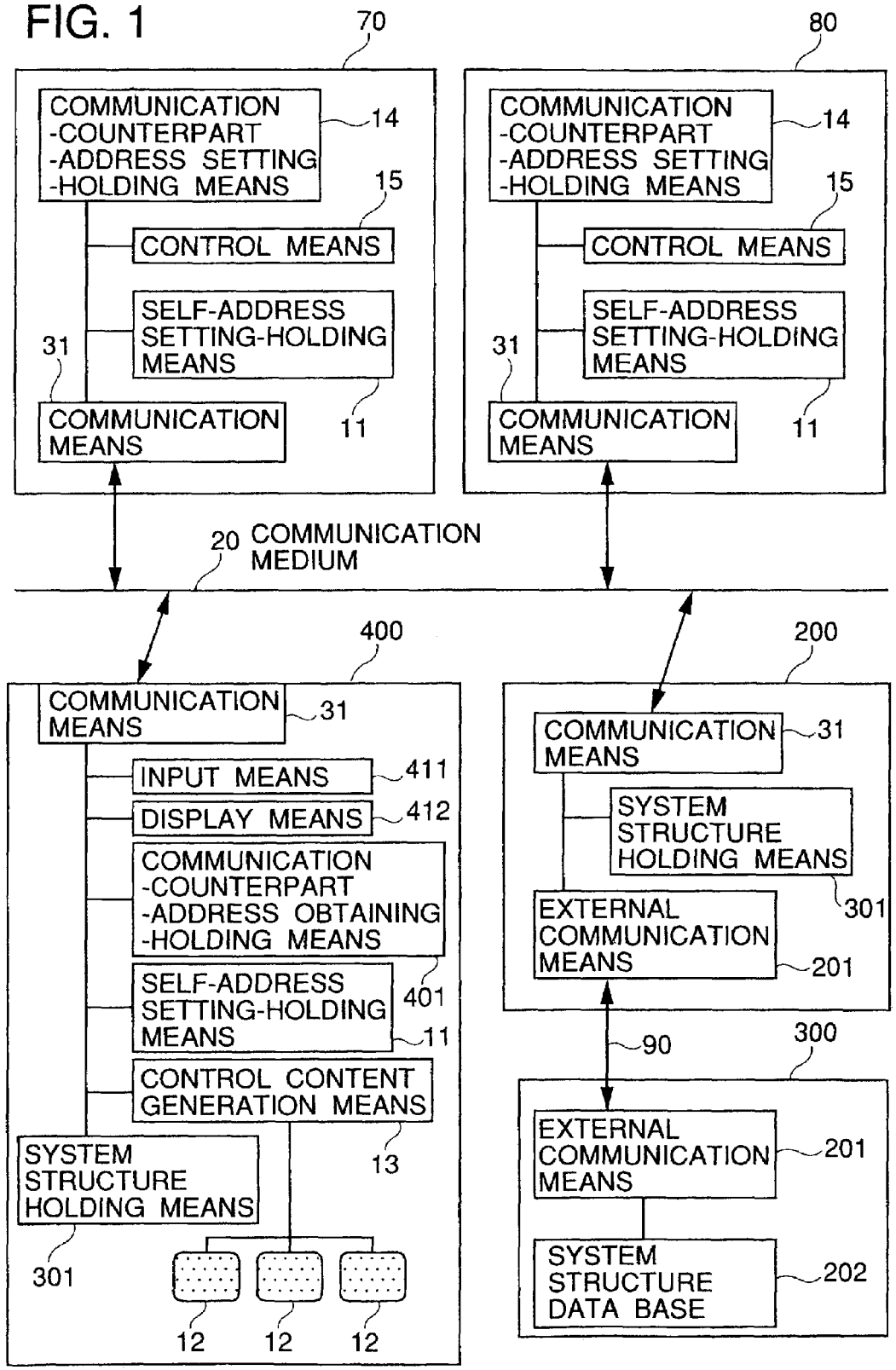

FIG. 2(A) SELF-ADDRESS FORMAT

| HOUSE CODE | SUBSYSTEM ID | DEVICE ID | DEVICE No. |
|---|---|---|---|

FIG. 2(B) SELF-ADDRESS EXAMPLE OF AIR-CONDITIONER INDOOR UNIT 1

| HOUSE A | AIR-CONDITIONER SUBSYSTEM | AIR-CONDITIONER DEVICE | AIR-CONDITIONER NUMBER 1 |
|---|---|---|---|

FIG. 2(C) SELF-ADDRESS EXAMPLE OF REFRIGERATOR NUMBER 1

| HOUSE A | KITCHEN SUBSYSTEM | REFRIGERATOR DEVICE | REFRIGERATOR NUMBER 1 |
|---|---|---|---|

FIG. 9 (A) FUNCTIONAL DESCRIPTION FORMAT
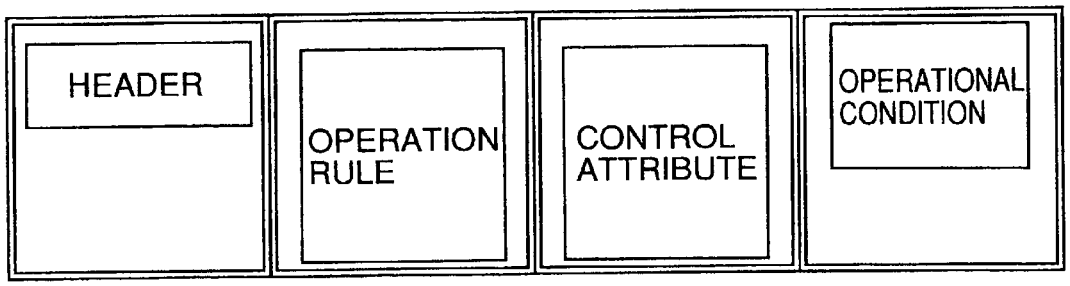
FIG. 9 (B) EXAMPLE OF FUNCTIONAL DESCRIPTION FORMAT
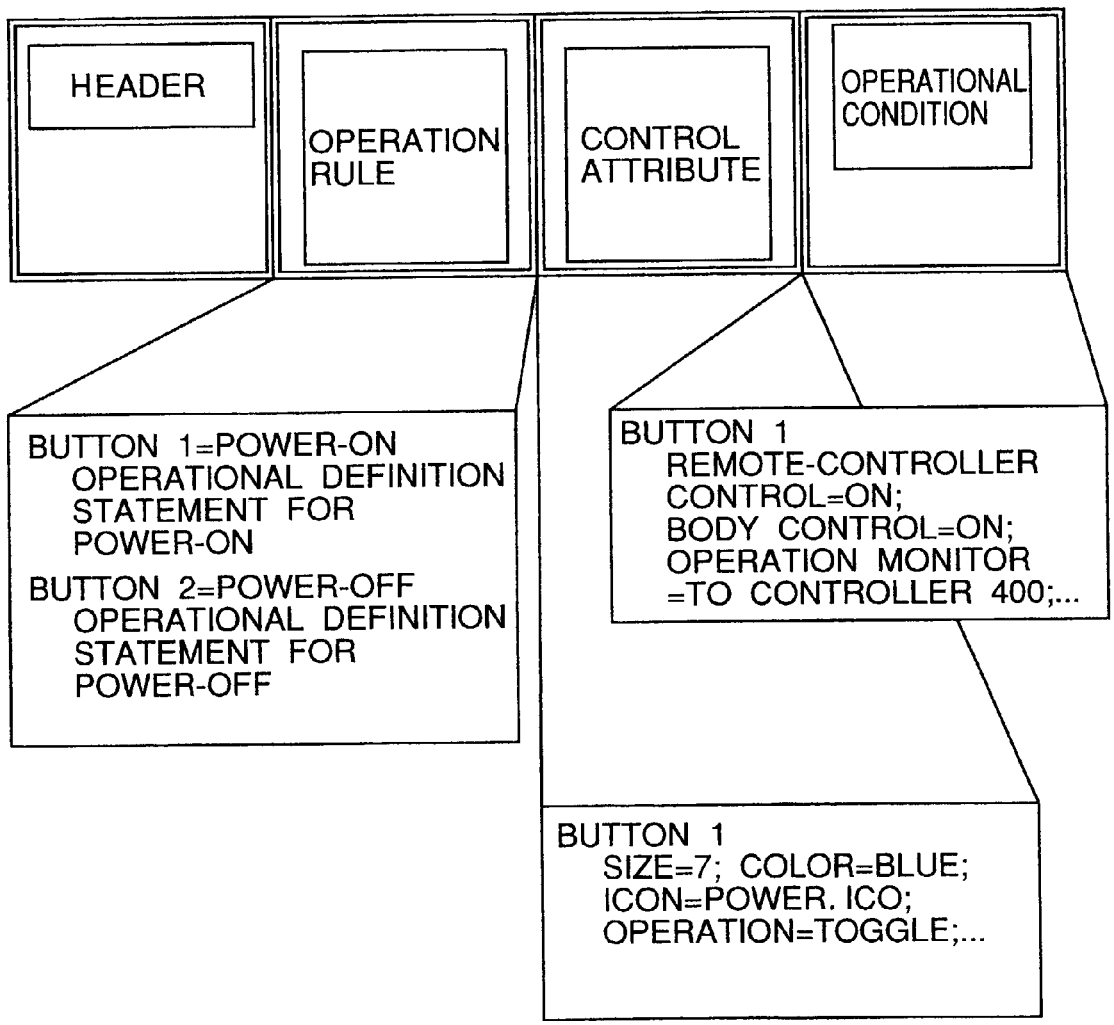

Button indication before setting

Button indication after setting

CONTROLLED DEVICE, CONTROLLER, INFORMATION CONTROL CENTER, INITIALIZATION-ALLOWING COMMUNICATION SYSTEM, AND COMMUNICATION CONTROL SYSTEM AND MEDIUM

This application is a divisional of U.S. patent application Ser. No. 09/160,766 filed Sep. 24, 1998 now U.S. Pat. No. 6,584,364.

BACKGROUND OF THE INVENTION

1. Field of the Invention

The present invention relates to a controlled device, controller, information control center, initialization-allowing communication system, and communication control system and medium which can be used for a communication system in which one device or more and a controller for controlling the device or devices are connected to each other by any communication means.

2. Description of the Related Art

Generally, in the case of a system in which one device or more (hereafter, this or these may be merely referred to as a device or devices) and a controller for controlling the device or devices are connected to each other by any communication means and controlled by each other, communication initialization is necessary in order to communicate with each other. The communication initialization represents setting the address, number of each device in communication or the address number of the device of a communication counterpart to each device. Conventionally, the above setting has been manually and individually performed when starting a system. Operations of a conventional initialization-allowing communication system are described below by referring to the accompanying drawings.

FIG. 14 is a block diagram showing a conventional initialization-allowing communication system. The structure in FIG. 14 is constituted with a device 10 and a controller 50, the device 10 and the controller 50 are connected by a communication medium 20 through communication means 31, and they can be communicated with each other. Moreover, the device 10 and controller 50 are provided with self-address setting-holding means 11 for setting and holding the addresses of their own and communication-counterpart-address setting-holding means 14 for setting and holding the address of a counterpart to be communicated with. Furthermore, the device 10 is provided with control means 15 and the controller 50 is provided with a button 12 for controlling the device 10 and control content generation means 13 for detecting that the button 12 is pressed, generating corresponding control contents, and sending the contents to the communication means 31 in addition to the control means 15.

Operations of the conventional initialization-allowing communication system having the above structure are described below.

For the device 10 and controller 50 to communicate with each other, it is necessary to set self-addresses of their own and the address of a communication counterpart. Therefore, in order to set the self-addresses of the device 10 and controller 50, a user first sets the self-addresses by using the self-address setting-holding means 11. For the addresses, an address range or the like is previously specified by communication rules. For example, it is necessary that each unit has the sole address determined in a system so that the sole address is an optional number between numbers 1 and 7 and there is no duplicate number. The user sets the self-address of the device 10 to number 1 by using the self-address setting-holding means 11 of the device 10 and the self address of the controller 50 to number 7 by using the self-address setting-holding means 11 of the controller 50 in accordance with the above rules. The self-address of each unit is determined through the above operations. Then, the user sets the address of a counterpart with which each unit communicates. In this case, because the device 10 communicates with the controller 50 and the controller 50 communicates with the device 10, the user sets the communication-counterpart address of the device 10 to number 7 by using communication-counterpart-address setting-holding means 14 of the device 10 and the communication-counterpart address of the controller 50 to number 1 by using the communication-counterpart-address setting-holding means 14 of the controller 50. The communication-counterpart address of each unit is determined through the above operations and thereafter, communication can be made. That is, when the user presses, for example, the button 12 indicating power-on" of the controller 50, the control content generation means 13 of the controller 50 detects that the button 12 is pressed, generates corresponding control contents, and sends the contents to the communication means 31. The communication means 31 transmits the above control contents from the address number 7 to the address number 1 in accordance with the contents in the self-address setting-holding means 11 and the communication-counterpart-address setting-holding means 14. The transmitted control contents reach the control means 15 via the communication means 31 of the device 10 through the communication medium 20 and the control contents are executed. That is, when the power-on" button is pressed, the power supply of the device 10 is turned on.

To individually control a plurality of devices 10 by one controller 50, it is necessary to specify a device to be controlled by using a control device selection switch 912 provided for the controller 50.

Therefore, to set addresses of air conditioners 1 and 2 as the above-described initialization, the control device selection switch 912 is first set to the position indicating the air conditioner 1, then a series of setting operations above described is performed to complete the address setting of the air conditioner 1. Similarly to the above, the control device selection switch 912 is set to the position indicating the air conditioner 2 and then, a series of setting operations described above is performed to complete address setting of the air conditioner 2.

As described above, the conventional initialization-allowing communication system realizes mutual communication by manually performing communication initialization.

Then, a conventional communication control system constituted with a device and a controller for controlling the device is described.

That is, in the case of the conventional communication control system, the contents for the controller to control the device are previously set in the controller. Operations of the conventional communication control system are described below by referring to FIG. 15.

FIG. 15 is a block diagram showing a conventional communication control system. The structure in FIG. 15 is constituted with a device 10 and a controller 50, in which the device 10 and the controller 50 are connected to each other by a communication medium 20 through communication means 31 of the device 10 and that of the controller 50 so that they can communicate with each other. Moreover, the device 10 is provided with communication means 15 and the controller 50 is provided with a button 12 for controlling the device 10, key input detection means 811 for detecting that the button 12 is pressed, and control content generation means 13 for generating the control contents corresponding to the key input detection means 811 and sending the contents to the communication means 31.

Operations of the conventional communication control system having the structure are described below.

When a user presses, for example, the button 12 of the controller 50 indicating power-on," the key input detection means 811 of the controller 50 detects that the button 12 is pressed and moreover, the control content generation means 13 generates control contents addressed to the device 10 corresponding to the control content generation means 13 and sends the contents to the communication means 31. The communication means 31 reaches the control means 15 via the communication means 31 of the device 10 through the communication medium 20 to execute the control contents. That is, when the power-on" button is pressed, the power supply of the device 10 is turned on.

As described above, in the case of the conventional communication control system, control contents corresponding to the case in which a button is pressed is previously set to control content generation means in a controller and thereby, a device can be controlled.

In the case of a conventional initialization-allowing communication system, however, it is necessary to manually perform the above setting as initialization before starting communication. Because the above setting operation requires the knowledge of address setting, the operation can be performed only by a person skilled to a certain extent. Therefore, a person in charge of setting work is necessary to set this type of system and therefore, this type of system is not preferable from the viewpoint of cost and man-hour. Moreover, because it is normally difficult for a housewife, old person, or child to perform the above setting, it is necessary to call a person in charge of work whenever extending or maintaining a device. Therefore, the system also has an aspect of preventing this type of communication device from spreading to homes.

In the case of a conventional communication control system, it is impossible to control the control contents which are not set to the above control content generation means. This has a problem that, when there are a device and a controller for controlling the device and thereafter, a new device having functions higher than those of the former device is purchased, the controller for controlling the former device cannot control the higher functions of the newly purchased device, that is, the controller cannot correspond to the change of devices.

SUMMARY OF THE INVENTION

It is an object of the present invention to provide a controlled device, controller, information control center, and initialization-allowing communication system and its medium making it possible to simply perform initialization compared to a conventional case by considering the above problems of a conventional initialization-allowing communication system.

It is another object of the present invention to provide a communication control system and its medium making it possible for a controller to easily correspond to the change of devices by considering the above problems of a conventional communication control system.

A first aspect of the present invention is a controlled device to be controlled by a controller, wherein an information control center having a data base storing a plurality of pieces of combined information between said controller and a controlled device corresponding to said controller transmits a piece of combined information to a controller included in the piece of combined information in accordance with a transmission request for requesting the information control center to transmit any one of said pieces of combined information when receiving said request.

A second aspect of the present invention is a controller for controlling a controlled device, wherein an information control center having a data base storing a plurality of pieces of combined information between said controller and a controlled device corresponding to said controller transmits a piece of combined information to a controller included in the piece of combined information in accordance with a transmission request for requesting the information control center to transmit any one of said pieces of combined information when receiving said request.

A third aspect of the present invention is an information control center having a data base storing a plurality of pieces of combined information between a controller and a controlled device corresponding to said controller, wherein said information control center transmits a piece of combined information to a controller included in the piece of combined information in accordance with a request for requesting said information control center to transmit any one of said pieces of combined information when receiving said request.

A fourth aspect of the present invention is a controlled device to be controlled by a controller, wherein an information control center having a data base storing a plurality of pieces of combined information between said controller and the controlled device corresponding to said controller transmits said combined information to controllers included in the combined information at predetermined timing.

A fifth aspect of the present invention is a controller for controlling a controlled device, wherein an information control center having a data base storing a plurality of pieces of combined information between said controller and the controlled device corresponding to said controller transmits said combined information to controllers included in the combined information at predetermined timing.

A sixth aspect of the present invention is an information control center having a data base storing a plurality of pieces of combined information between a controller and a controlled device corresponding to said controller, wherein said information control center transmits said combined information to controllers included in said combined information at predetermined timing.

A seventh aspect or the present invention is an initialization-allowing communication system comprising:

a controlled device to be controlled;

a controller for controlling said controlled device; and an information control center having a data base storing a plurality of pieces of combined information between said controller and the controlled device corresponding to said controller, wherein said information control center transmits a piece of combined information to a controller included in said piece of combined information in accordance with a request for requesting said information control center to transmit any one of said pieces of combined information when receiving said request.

An eighth aspect of the present invention is an initialization-allowing communication system comprising:

a controlled device to be controlled; and a controller for controlling said controlled device; and an information control center having a data base storing a plurality of pieces of combined information between said controller and the controlled device corresponding to said controller, wherein said information control center transmits said combined information to controllers included in said combined information at predetermined timing.

A further aspect of the present invention is a controlled device to be controlled by a controller, wherein said controlled device is provided with first functional-information holding means for holding the functional information for said controlled device, and requested functional information is transmitted to said controller in accordance with a transmission request for said held functional information when the request is sent to said controlled device.

A still further aspect of the present invention is a controller for controlling a controlled device, wherein said controlled device is provided with first functional-information holding means for holding the functional information for said controlled device, the functional information transmitted from said controlled device is received in accordance with a request for transmitting said held functional information when the request is sent to said controlled device.

An additional aspect of the present invention is a communication control system comprising a controlled device to be controlled and a controller for controlling said controlled device through a communication medium, wherein said controlled device is provided with first functional-information holding means for holding the functional information for said controlled device, and requested functional information is transmitted to said controller in accordance with a request for transmitting said held functional information when the request is sent to said controlled device.

Still another aspect of the present invention is a medium wherein a program for making a computer execute functions of all or some of means of any one of the above-mentioned inventions is recorded.

BRIEF DESCRIPTION OF THE DRAWINGS

FIG. 1 is a block diagram of the initialization-allowing communication system of the first embodiment of the present invention;

FIGS. 2(A) to 2(C) are illustrations showing the self-address format of the first embodiment of the present invention;

FIGS. 9(A) and 9(B) are illustrations showing the functional description of the fourth embodiment of the present invention;

[Description of symbols]

| | |
|---|---|
| 10 | Device (Controlled device) |
| 11 | Self-address setting-holding means |
| 14 | Communication-counterpart-address setting-holding means |
| 12 | Button |
| 13 | Control content generation means |
| 15 | Control means |
| 20 | Communication medium |
| 31 | Communication means |
| 50 | Controller |
| 62 | Communication-counterpart-address obtaining means |
| 90 | External communication medium |
| 101 | Functional description holding means |
| 102 | Functional description interpretation means |
| 103 | Mode switching means |
| 104 | Display means |
| 110 | Functional description development means |
| 201 | External communication function |
| 200 | External communication apparatus |
| 202 | System structure data base |
| 300 | External communication center |
| 301 | System structure holding means |
| 400 | Controller |
| 401 | Communication-counterpart-address obtaining-holding means |
| 811 | Key input detection means |
| 901 | Enciphering-deciphering means |
| 903 | Terminal certification means |

DETAILED DESCRIPTION OF THE PREFERRED EMBODIMENTS

The preferred embodiments of the present invention are described below by referring to the accompanying drawings.

(First Embodiment)

FIG. 1 is a block diagram showing the initialization-allowing communication system of the first embodiment of the present invention.

Figure 14:
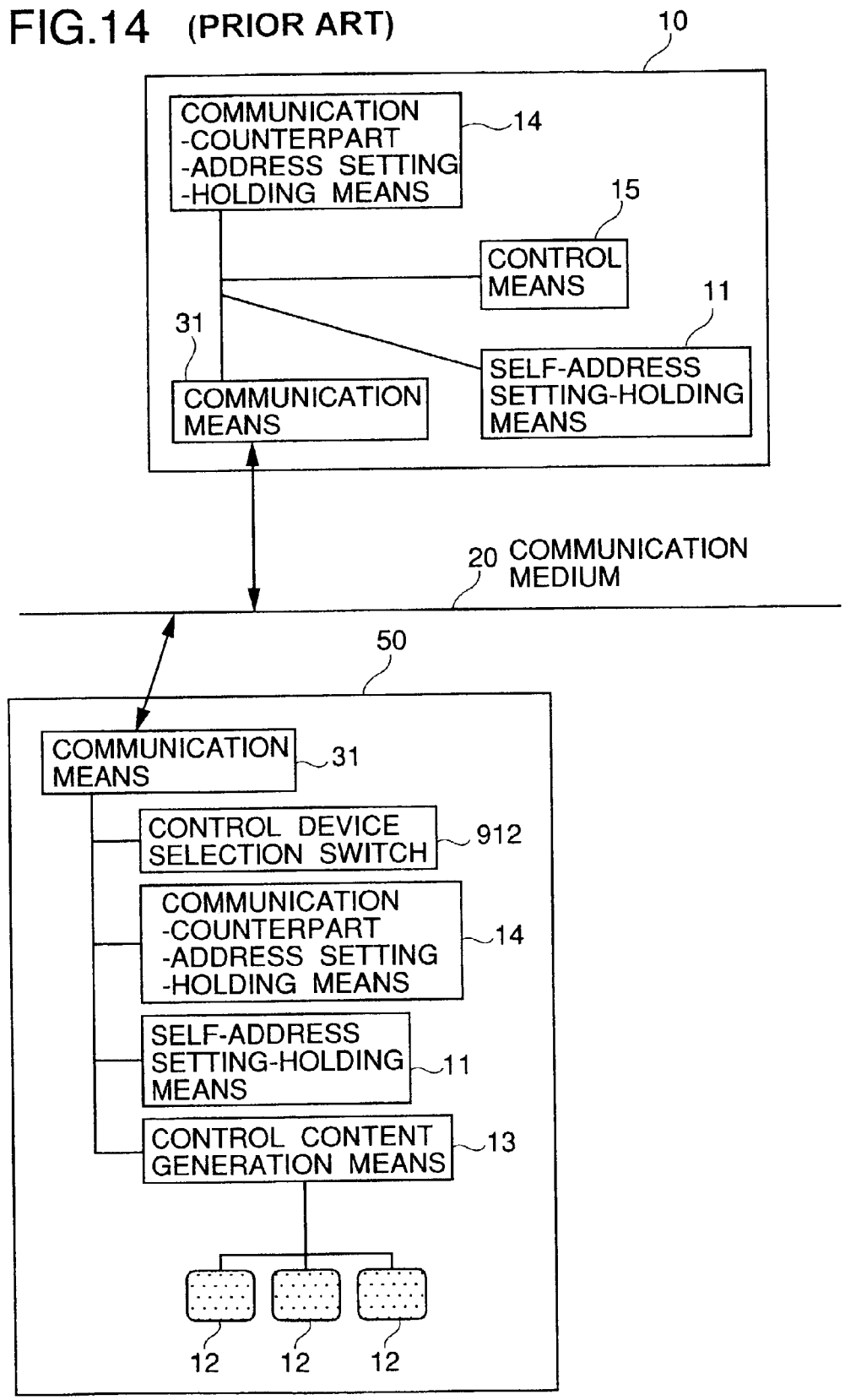
FIG. 14 is a block diagram of a conventional initialization-allowing communication system.

As shown in FIG. 1, this embodiment is mainly different from the conventional structure described by referring to FIG. 14 in that an external communication apparatus and an external communication center are added to the conventional structure. Therefore, in this embodiment, a component same as that of the conventional example is provided with the same symbol and its description is omitted. Moreover, a component having no description is assumed to be same as that of the conventional example.

As shown in FIG. 1, the initialization-allowing communication system of this embodiment makes it possible that a first device 70, a second device 80, a controller 400, and an external communication apparatus 200 are connected by a communication medium 20 so that they can communicate with each other. Moreover, the external communication apparatus 200 is connected with an external communication center 300 by an external communication medium 90 such as a public telephone line through external communication means 201. The external communication center 300 corresponding to an information control center of the present invention is provided with the external communication means 201 and a system structure data base 202 and is able to communicate with the external communication means 201 of a plurality of external communication apparatuses 200 through the external communication means 201. FIG. 1 is an illustration showing that the external communication center 300 connects with one of the certain external communication apparatuses 200. Moreover, the system structure data base 202 stores a plurality of pieces of combined information between the controller 400 and a controlled device (e.g. device 70) corresponding to the controller 400. In this case, the above combined information includes the corresponding information that a control object of the controller 400 is the device 70 and the information for the self-address of the device 70 (that is, the communication-counterpart address of the controller 400). These pieces of information are further described later while referring to FIG. 3.

Though internal structures of the devices 70 and 80 and the controller 400 are the same as those described for the conventional example in FIG. 14, the controller 400 of the first embodiment is provided with communication-counterpart-address obtaining-holding means 401 instead of the communication-counterpart-address setting-holding means 14 described for the conventional example and moreover, provided with system structure holding means 301 for holding a structure of the device, input means 411, and display means 412.

The communication-counterpart-address obtaining-holding means 401 is means for communicating with the external communication apparatus 200 through each communication means 31 provided for the controller 400 and external communication apparatus 200 and moreover, obtaining a communication-counterpart address from the system structure data base 202 in the external communication center 300 through the external communication means 201 provided for the external communication apparatus 200. Moreover, the external communication apparatus 200 is provided with the system structure holding means 301. In this case, a controlled device of the present invention corresponds to the devices 70 and 80 and moreover, a controller of the present invention corresponds to the controller 400.

Operations of the first embodiment of the initialization-allowing communication system of the present invention constituted as described above are described below and moreover, operations of a controlled device, controller, and information control center of the present invention are described below.

A user simultaneously or individually purchases the above devices 70 and 80, controller 400, and external communication apparatus 200 from a store (distributor) or the like. In this case, a self-address is set to each device by the supplier such as a store or manufacturing factory. Moreover, the information corresponding to a controller and a controlled device to be controlled by the controller is determined.

In this case, it is assumed that the self-address of the device purchased by the user is set by the distributor and moreover, the combined information including the above corresponding information is entered in the external communication center 300. Therefore, the above information about devices purchased by each user is sent to the external communication center 300 from each distributor. Moreover, the corresponding information which device should be determined as the control object of the controller 400 is set by a distributor while confirming the intention of a user.

In this case, it is assumed that a self-address is constituted with a house code showing the setting place of each device, a subsystem ID showing the ID of a subsystem in a set system, a device ID showing the type of a device, and a device number showing the number of a device. In this case, the telephone number of the above user or a member's number provided for the user by the distributor can be used as a house code.

FIG. 2(A) shows a self-address format. The air conditioner subsystem and the kitchen subsystem set in a house A are examples of subsystems.

Figure 3:
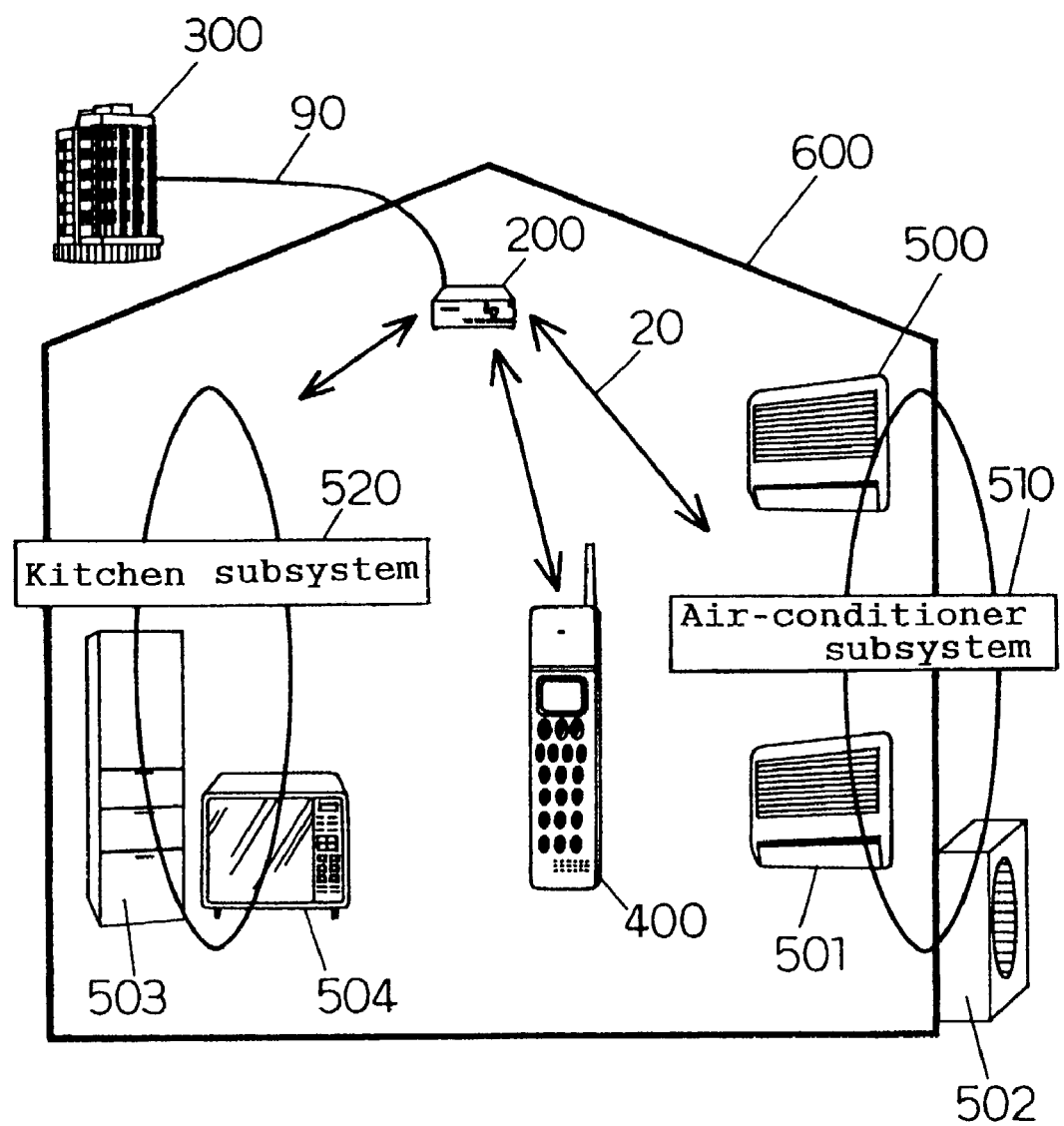
FIG. 3 is an image diagram showing the procedure of the first embodiment of the present invention.

Moreover, FIG. 3 shows the above image. The structure shown in FIG. 3 is the same as the structure in FIG. 1 above described and components provided with the same symbol has the function described for FIG. 1.

That is, in FIG. 3, an air conditioner subsystem 510 and a kitchen subsystem 520 are connected in addition to the external communication apparatus 200 and controller 400 as devices connected through the communication medium 20. The air conditioner subsystem 510 is constituted with a first indoor unit 500, a second indoor unit 501, and an outdoor unit 502 and the kitchen subsystem 520 is constituted with a refrigerator 503 and an electronic oven 504. All these devices are set in the house A600. Therefore, the above house code serves as a code showing the house A. The self-address of the first indoor unit 500 of the air conditioner subsystem 510 is shown in FIG. 2(B) and that of the refrigerator 503 of the kitchen subsystem 520 is shown in FIG. 2(C).

Then, a distributor setting the self-address of each device sends these pieces of combined information to the external communication center 300. Then, these pieces of combined information are stored in the system structure data base 202.

That is, in the case of the example shown in FIG. 3, the contents are stored in the system structure data base 202, that the air conditioner subsystem 510 and kitchen subsystem 520 are connected to the house A in addition to the external communication apparatus 200 and controller 400, the air conditioner subsystem 510 is constituted with the first indoor unit 500, second indoor unit 501, and outdoor unit 502, and the kitchen subsystem 520 is constituted with the refrigerator 503 and electronic oven 504."

Then, operations until the user can control the arranged devices 70 and 80 by using the newly purchased controller 400 are mainly described below.

In FIG. 1, no information is held by the communication-counterpart-address obtaining-holding means 401 or system structure holding means 301 of the controller 400 immediately after purchasing the controller 400. Therefore, even if the button 12 of the controller 400 is pressed and the control content generation means 13 detecting that the button 12 is pressed generates such control contents as power-on," the structure of a device is not held by the system structure holding means 301 or a communication-counterpart address is not held by the communication-counterpart-address obtaining-holding means 401. Therefore, it is unknown at present to which device the control contents indicating power-on" are issued. Thus, it is impossible to send communication data to the communication means 31 and control any device.

To clarify a device to be controlled by the controller 400, the communication-counterpart-address obtaining-holding means 401 must inquire of the external communication apparatus 200 through the communication means 31 and communication medium 20 about a device to be controlled.

The opportunity for the inquiry is generated as shown below.

That is, when monitoring means for monitoring the change of current values of a power supply line is provided for the power supply line and a new device is set, the change of slight current values of the device is detected and the detection result is sent to the controller 400. The controller 400 receives the detection result, decides that a new device is set, and commands the communication-counterpart-address obtaining-holding means 401 to execute the above inquiry. In addition to the above method, it is also possible that the controller 400 regularly performs the above inquiry or the user gives the designation for start of an inquiry to the controller 400.

When necessary information is held by the system structure holding means 301 of the external communication apparatus 200, the external communication apparatus 200 provides the necessary information for the communication-counterpart-address obtaining-holding means 401. However, at this initial stage, necessary information is not generally held by the system structure holding means 301 of the external communication apparatus 200. Therefore, the external communication apparatus 200 is accessed to the system structure data base 202 through the external communication means 201, external communication medium 90, and external communication function 201 of the external communication center 300. Moreover, the external communication apparatus 200 refers to necessary information and provides information for the communication-counterpart-address obtaining-holding means 401 of the controller 400 and system structure holding means 301.

The above procedure is described below by referring to the flowchart shown in FIG. 4.

Figure 4:
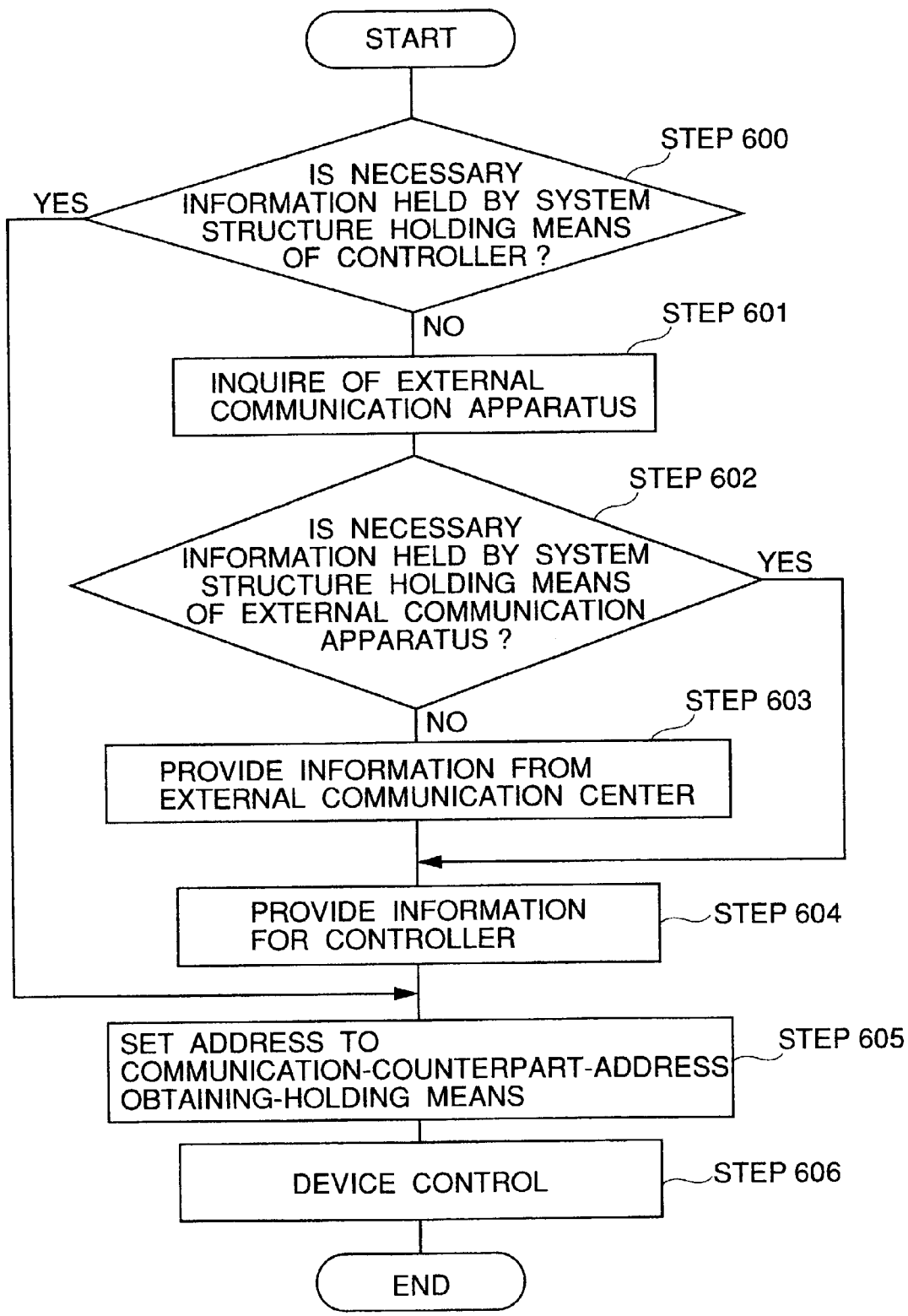
FIG. 4 is a flowchart showing the procedure of the first embodiment of the present invention.

FIG. 4 is a flowchart showing the procedure for the controller 400 to correctly perform control when necessary information is provided for the communication-counterpart-address obtaining-holding means 401 and system structure holding means 301.

That is, as shown in FIG. 4, the communication-counterpart-address obtaining-holding means 401 of the controller 400 checks if the information for a communication-counterpart address is present in the system structure holding means 301 of the controller 400 in step 600.

If necessary information is present as the result of the above processing in step 600, step 605 is started to set the communication-counterpart address and a control object can be controlled in step 606. The above processing is more specifically described below by referring to the structure shown in FIG. 3.

That is, as described above, at the initialization stage, if the fact that a control object of the controller 400 is the first indoor unit 500 of the air conditioner subsystem 510 and its self-address is held by the system structure holding means 301 of the controller 400 though these are conditions not normally present, step 600 is completed and step 605 is started to set the self-address of the first indoor unit to the communication-counterpart-address obtaining-holding means 401 as a communication-counterpart address in step 605 and control the address in step 606.

In this case, FIG. 4 is described again. Then, unless there is any necessary information in the system structure holding means 301 in step 600, an inquiry is sent to the external communication apparatus 200 in step 601.

When there is necessary information in the system structure holding means 301 of the external communication apparatus 200, the information is provided for the system structure holding means 301 of the controller 400 in step 604.

These processings are more specifically described below by referring to the structure in FIG. 3. That is, it is assumed that the following information is held by the system structure holding means 301 of the external communication apparatus 200 as the structure of a system having a house code of the house A. That is, it is assumed that the fact that the structure is constituted with the air conditioner subsystem 510 and the kitchen subsystem 520, the air conditioner subsystem 510 is constituted with the first indoor unit 500, second indoor unit 501, and outdoor unit 502, the kitchen subsystem 520 is constituted with the refrigerator 503 and electronic oven 504, and moreover the control object of the controller 400 is the first indoor unit 500 of the air conditioner subsystem 510 and the self-address of the first indoor unit 500 are held as the information for the structure of the system of the house A. In this case, the fact that the control object of the controller 400 is the first indoor unit 500 of the air conditioner subsystem 510 and information about the self-address of the first indoor unit 500" are provided for the controller 400 as necessary information out of the system structure information in step 604, and hereafter similarly to the above mentioned, the self-address of the first indoor unit 500 is set to the communication-counterpart-address obtaining-holding means 401 in step 605, and the means 401 is controlled in step 606.

In this case, unless the above-described information is found in the system structure holding means 301 of the external communication apparatus 200 in step 602, necessary information is provided from the system structure data base 202 of the external communication center 300 in step 603 to perform control in accordance with the procedure same as the above described. The initialization stage corresponds to the above case.

The processing in the above case is more specifically described below by referring to FIG. 3. That is, system structure information concerned with not only the house code of the house A but also all house codes is stored in the system structure data base 202 of the external communication center 300 as described above. Therefore, when transmission of the above corresponding information is requested to the external communication center 300 from the controller 400, the external communication apparatus 200 retrieves and extracts only the information concerned with the house code of the house A out of the corresponding information by using the self-address (already set by a distributor) of the controller serving as a request source attached to the transmission request.

Thus, at the initialization stage, it is possible to finally know a communication-counterpart address by successively following up necessary information even if the communication-counterpart address is not set to the controller 400 and make the controller 400 obtain and hold a device which is the control object of the controller 400.

Figure 5:
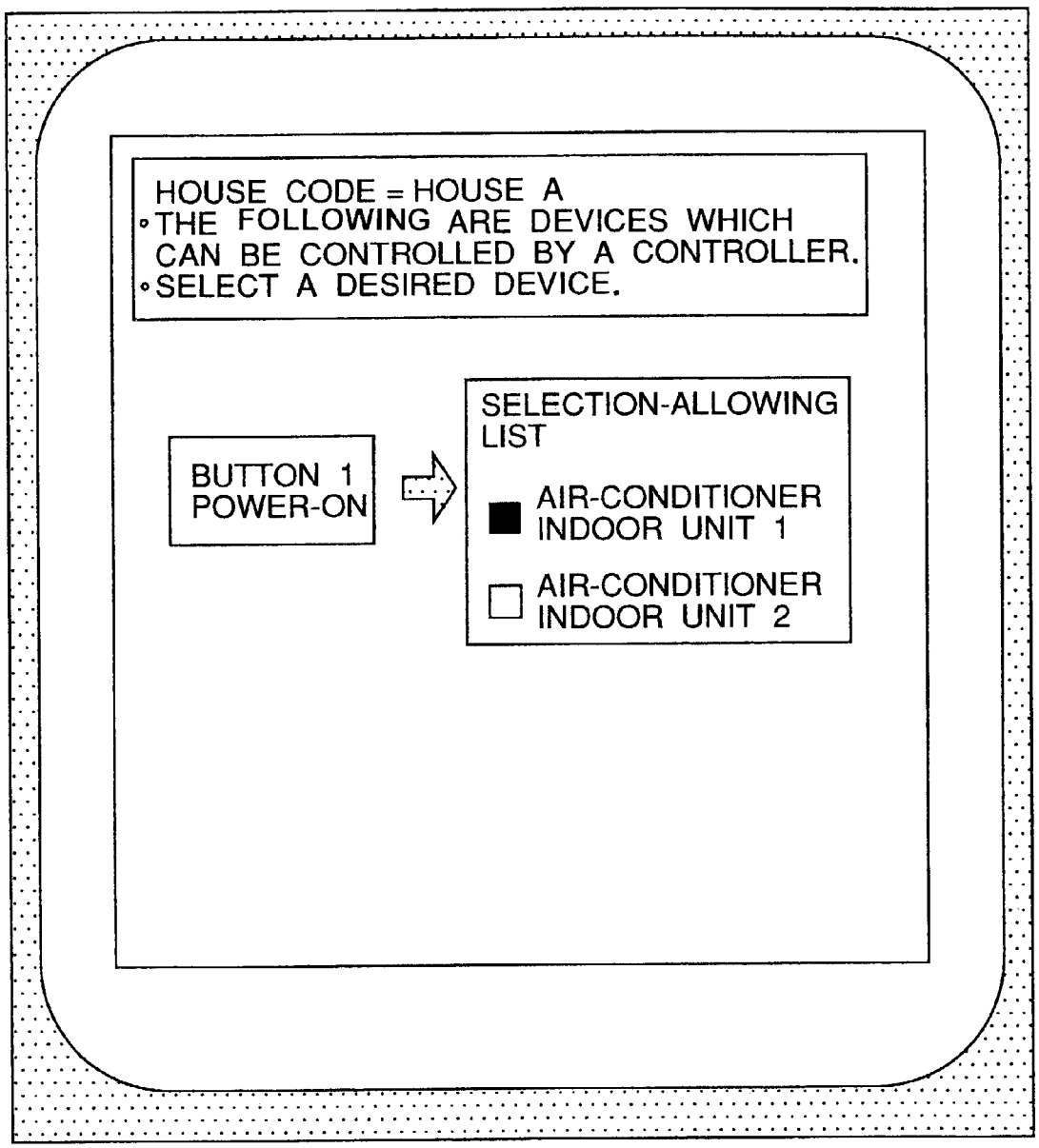
FIG. 5 is an illustration showing a display example by the display means of the first embodiment of the present invention.

The above description shows a case of setting a communication-counterpart address to the controller 400 without using the input means 411 or display means 412. Then, a case of using these means is described below by referring to FIG. 5. FIG. 5 shows a display state when selecting a control object.

That is, in this case, though slightly different from the above-described cases, it is also possible to make the controller 400 shown in FIG. 1 display the system structure information on the display means 412 and moreover, select an object to be controlled by the controller 400 by using the input means 411.

In FIG. 5, a selection-allowing list is displayed so as to show that there are an air-conditioner indoor unit 1 and an air-conditioner indoor unit 2 as devices, which can be controlled by the controller 400. Therefore, the example in FIG. 5 is different from the above example in situation setting. That is, in the case of the above example, when purchasing a controller and each device, corresponding information showing which device is to be controlled is determined by a distributor and thereafter, the information is used without changing it. In this case, however, the air-conditioner indoor units 1 and 2 which can be controlled by the controller 400 are temporarily determined as the above corresponding information and thereafter, a user can select a device to be actually controlled by the user out of the units.

However, also in FIG. 5, the point that only the air-conditioner indoor unit 1 is made into the control object of the controller 400 is the same as the above example. Therefore, in FIG. 5, a state is displayed in which only the air-conditioner indoor unit 1 is selected through the operation of the input means 411 by a user. In this case, the selection-allowing list represents that it is a list of devices whose power supplies can be turned on by pressing the button 1 of the controller 400 as understood from the indication of button 1 power-on" in FIG. 5. Moreover, by displaying individual specific setting place such as a living room or bedroom at the right side of the indication of the air-conditioner indoor unit 1 or 2 in the selection-allowing list, discrimination is more easily made. However, it is necessary to determine the setting-place information by the distributor when purchasing each device and set the information as a part of self-address information.

The above processing is specifically performed in the above step 605.

By performing the processing, when purchasing the air-conditioner units 1 and 2 from a distributor, the corresponding information showing which device is controlled by the controller 400 is temporarily set. However, it is possible to thereafter change the information.

However, when actually controlling a device after a communication-counterpart address is set to the controller 400, it is necessary for a user to input the control device selection information showing which device is controlled from now to the controller 400. The control device selection information can be easily input by setting the mode for inputting the control device selection information and thereafter, using the input means 411 and display means 412 described for FIGS. 1 and 5. However, as already described, a device to be controlled by the controller 400 is only the air-conditioner indoor unit 1. Therefore, in this case, display contents of the display means 412 are different from those in FIG. 5 and thus, only the air-conditioner indoor unit 1 is displayed as an air conditioner. Of course, it is needless to say that the air-conditioner indoor units 1 and 2 can be displayed as devices to be controlled when not only the unit 1 but also the unit 2 are entered in the controller 400.

Thus, according to this embodiment 1, it is possible to constitute the self-address of each device with a house code showing a setting place, a system ID showing the ID of a subsystem in a set system, a device ID showing the type of a device, and a device number showing a device number, set the self-address when shipping or selling each device, and store it in the system structure data base of an external communication center. Moreover, it is possible to provide system structure holding means for an external communication apparatus and a controller, set and hold necessary information to and in communication-counterpart-address obtaining-holding means when the necessary information is present in system structure holding means in a controller and finally obtain the data concerned from the system structure data base of the external communication center by successively performing inquiries when the necessary information is not present in the system structure holding means. Therefore, a user can simply perform communication initialization. Furthermore, by using the above structure, it is possible to provide an initialization-allowing communication system having a simple structure because it is enough for each system structure holding means to hold only the information necessary for each system structure holding means.

Furthermore, by making it possible to update the system structure data base of the external communication center by accessing the data base from the external communication function and change the system structure data base from a place other than the external communication center, it is possible to update the system structure data base from any place through the remote control without updating the system structure data base in the external communication center each time.

Furthermore, because combined information of the present invention includes corresponding information and self-address information in the case of the above embodiment, a case is described in which a self-address is provided with a house code for distinguishing between houses of users. However, it is also possible to use an ID uniquely provided for each controller to distinguish between a controller and a device to be controlled by the controller. Moreover, in this case, when it is possible to distinguish between devices to be controlled in accordance with specific information for the setting place of each device such as a living room or bedroom, it is possible to realize the combined information of the present information by using the information corresponding between the ID unique to each controller and the above-mentioned specific-setting-place information. In short, the combined information of the present invention can use any information as long as the information shows how a controller and a device to be controlled by the controller correspond to each other.

Furthermore, a request for transmitting combined information of the present invention is described as an inquiry about a device to be controlled in the case of the above embodiment. As the opportunity for executing the transmission request, a case is described in which monitoring means is set to a power supply line. Moreover, when a newly set device communicates that the device is set to a controller, it is also possible for the controller to transmit the above transmission request by making the communication an occasion. Furthermore, in this case, it is possible for the device to directly transmit the transmission request to the external communication center 300. Furthermore, it is possible for a distributor to directly transmit the transmission request to the external communication center 300. Furthermore, it is possible for the external communication center 300 to transmit combined information to a controller at a predetermined timing regardless of presence or absence of the transmission request from an external unit.

(Second Embodiment)

Figure 6:
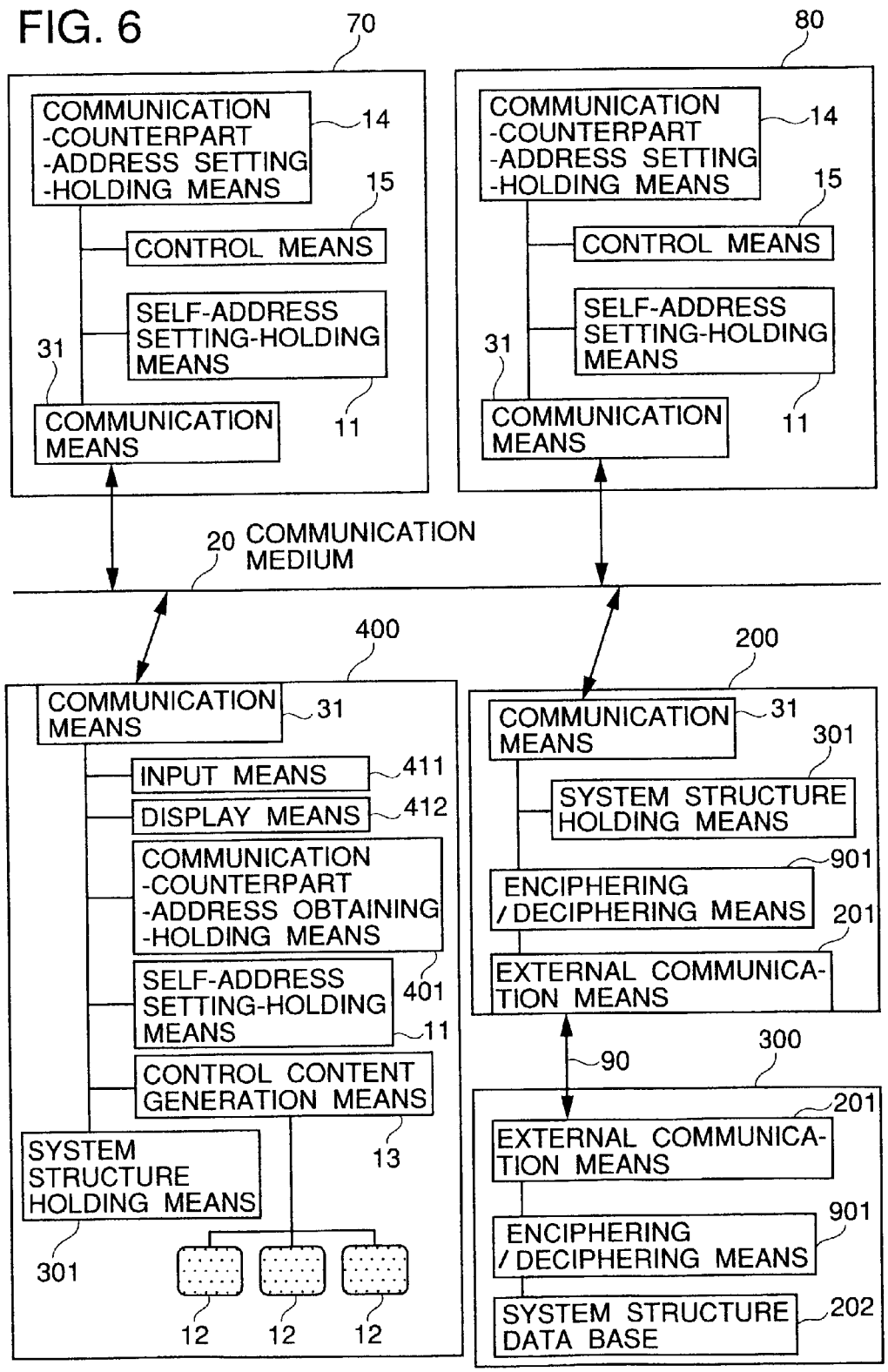
FIG. 6 is a block diagram of the initialization-allowing communication system of the second embodiment of the present invention.

FIG. 6 is a block diagram showing the initialization-allowing communication system of the second embodiment.

This embodiment is constituted by adding enciphering-deciphering means for enciphering and deciphering communication contents on the external communication medium of this embodiment into the external communication apparatus and external communication center of the first embodiment. Therefore, in this embodiment, a component same as that of the first embodiment is provided with the same symbol and its description is omitted. A component having no description is assumed to be the same as that of the first embodiment.

FIG. 6 is an illustration showing a structure constituted by adding enciphering-deciphering means 901 for enciphering and deciphering communication contents on the external communication medium 90 into the external communication apparatus 200 and external communication center 300 in FIG. 1.

Operations of the second embodiment of an initialization-allowing communication system of the present invention thus constituted are described below and simultaneously, operations of a controlled device, controller, and information control center of the present invention are described.

Though the operation for finally knowing a communication counterpart by successively following up necessary information when no communication-counterpart address is set to the controller 400 is the same as the case of the first embodiment, the communication contents between the external communication apparatus 200 and the external communication center 300 are enciphered by the enciphering-deciphering means 901. Therefore, even if monitoring the external communication medium 90 and looking in communication contents, persons other than the person who knows how to decipher the communication contents cannot understand the communication contents.

Thus, according to the second embodiment, it is possible to defend the privacy of a user and moreover secure the security because communication contents on an external communication medium is concealed.

(Third Embodiment)

Figure 7:
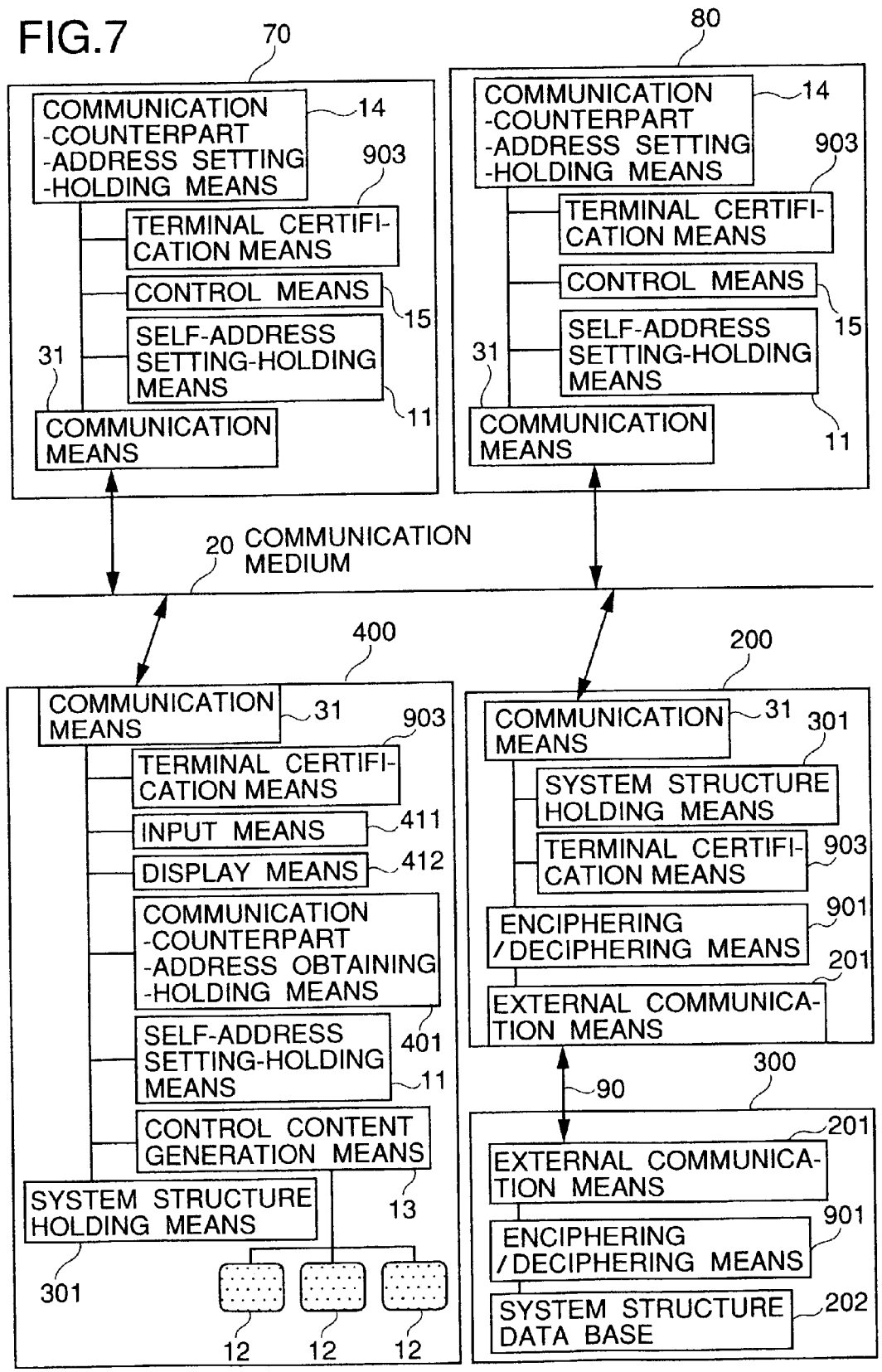
FIG. 7 is a block diagram of the initialization-allowing communication system of the third embodiment of the present invention.

FIG. 7 is a block diagram showing the initialization-allowing communication system of the third embodiment of the present invention.

This embodiment is constituted by adding terminal certification means for certificating a terminal of the present invention to each apparatus and device connected to the communication medium 20 of the second embodiment. Therefore, in this embodiment, a component same as that of the second invention is provided with the same symbol and its description is omitted. Moreover, a component having no description is assumed to be the same as that of the second embodiment.

FIG. 7 is an illustration showing a structure constituted by adding terminal certification means 903 for certificating that the means 903 is a proper communication counterpart when communicating with each other into the devices 70 and 80, controller 400 and external communication apparatus 200 in FIG. 6.

Operations of the third embodiment of an initialization-allowing communication system of the present invention thus constituted are described below and simultaneously, operations of a controlled device and controller of the present invention are also described.

The state for the controller 400 to control the device concerned in accordance with the operations described for the embodiments 1 and 2 is the same as the case of the embodiment 3. However, this embodiment 3 is different from the embodiments 1 and 2 in that communication on the communication medium 20 is formed only between terminals in which it is certificated that the terminal certification means 903 is a proper communication counterpart. Therefore, by using the terminal certification means 903, it is possible to prevent a malicious third party from improperly controlling a terminal on the communication medium 20 by using an improper terminal not provided with the terminal certification means 903. For terminal certification, various methods are considered including a method in which each terminal certification means 903 has a certain code and a new code obtained through a special operation between the certain code and a house code coincides with the certain code.

Thus, according to the embodiment 3, because the communication on a communication medium is formed only between proper terminals, radio-wave reaching range is large when using radio for a communication medium. Therefore, even when a malicious third party is present at a remote position, it is possible to secure the security including the fact that his improper operation can be prevented.

The same advantage can be obtained by preparing a medium such as a magnetic recording medium or optical disk recording a program for making a computer execute the functions (processing contents) of some or all of means (or steps) of any one of the above-described embodiments and using the medium and thereby executing the operations same as the above.

As described above, the present invention has an advantage that communication initialization can be automatically performed without participation of a user by system structure holding means in a controller, and communication-counterpart-address setting-holding means for setting and holding the address of a counterpart to be communication-controlled obtained from the information concerned with the system structure.

Moreover, by adding an external communication apparatus provided with system structure holding means for holding the information concerned with the system structure of the entire setting place to the above structure, the present invention can receive only the information concerned with a system structure to be controlled by the system structure holding means in the external communication apparatus through the communication means when necessary information is not held by the system structure holding means in the controller.

Furthermore, by providing a system structure data base for holding the information concerned with a system structure related to all of the above house codes for the above structure and adding an external communication center connected with the external communication apparatus through an external communication medium or external communication means such as a public telephone line to the above structure, the present invention can receive only the information concerned with a system structure to be controlled from the system structure data base in the external communication center through the external communication means when necessary information is not held by the system structure holding means in the external communication apparatus. Therefore, the present invention has an advantage of making it possible to change objects to be controlled by a controller even if devices are added or changed.

Furthermore, the present invention has advantages of making it possible to provide input means and display means for the controller, access the system structure holding means of the external communication apparatus and the system structure data base of the external communication center from the controller to make the display means display the data base, select a proper address by using the input means, and select or change the contents of the addresses of the system structure holding means of the controller and the communication-counterpart-address setting-holding means, and realize user customizing according to the taste of a user.

Furthermore, the present invention has advantages for making it possible to update the system structure data base of the external communication center by accessing the data base in accordance with the external communication function and change the system structure data base from a place other than the external communication center.

Furthermore, the present invention has an advantage of making it possible to prevent a third party from stealing a glance at the communication contents on the external communication medium by setting enciphering-deciphering means for enciphering the transmission contents on the external communication medium and deciphering enciphered reception contents into the external communication apparatus and the external communication center.

Furthermore, the present invention has an advantage of preventing an improper operation on the communication medium by setting terminal certification means for forming the communication on the communication medium only between proper terminals to the terminal on the communication medium.

Initialization of a communication-counterpart address in a communication system is described above. Then, embodiments of a communication control system of the present invention are described below by referring to the accompanying drawings. Hereafter, setting of control function of each device by a controller after the initialization is completed is described.

(Fourth Embodiment)

Figure 8:
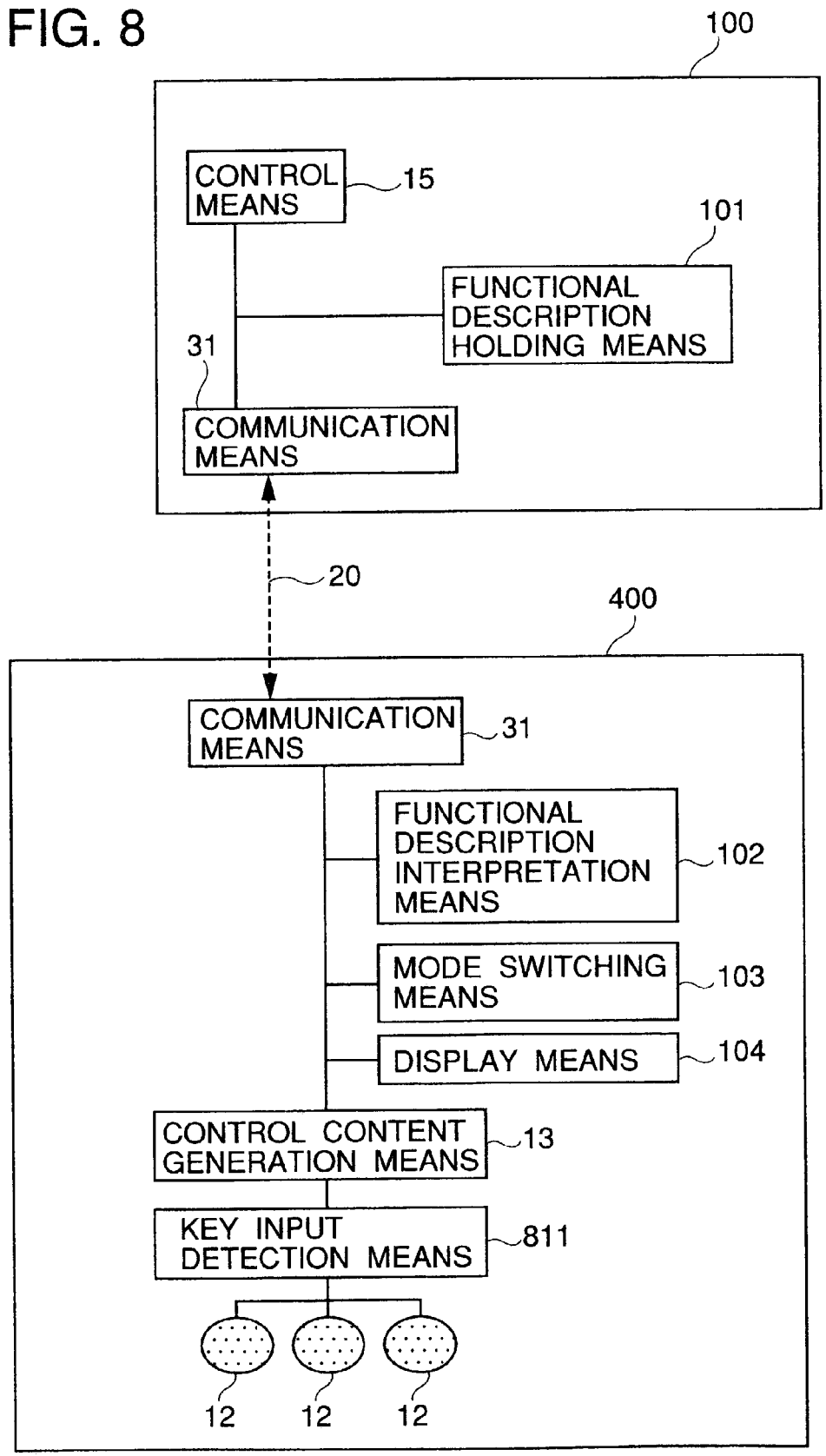
FIG. 8 is a block diagram of the communication control system of the fourth embodiment of the present invention.

FIG. 8 is a block diagram showing the communication control system of the fourth embodiment of the present invention.

Figure 15:
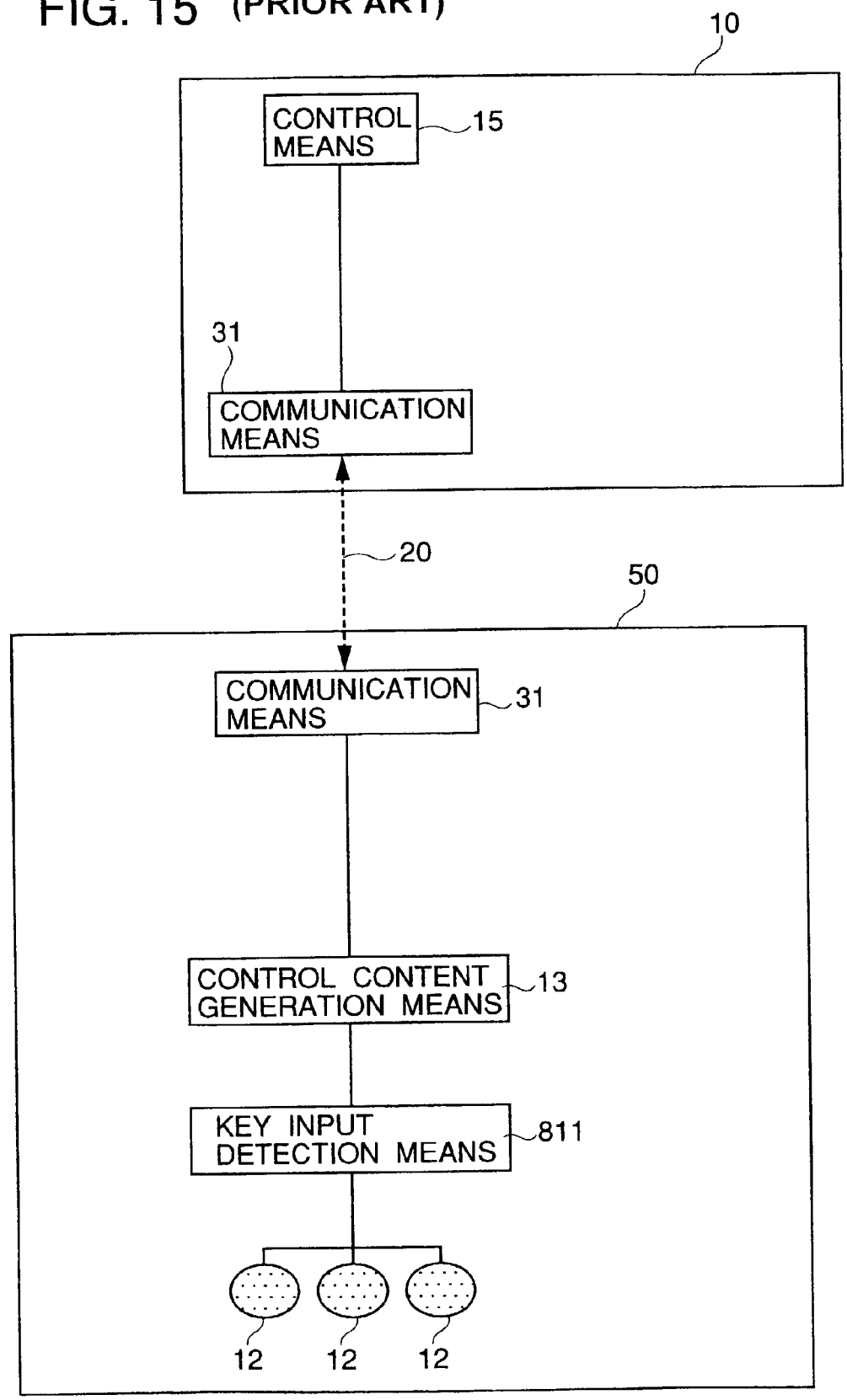
FIG. 15 is a block diagram of a conventional communication control system.

This embodiment is constituted by adding the external communication apparatus and external communication center of this embodiment to the structure of the conventional example described by referring to FIG. 15. Therefore, in this embodiment, a component same as that of the conventional example is provided with the same symbol and its description is omitted. Moreover, a component having no description is assumed to be the same as that of the conventional example.

FIG. 8 is an illustration showing that a device 100 is connected with a controller 400 by a communication medium 20 so that they can communicate with each other. Internal structures of each device 100 and the controller 400 are as described for the conventional example by referring to FIG. 15 except for the following.

That is, functional description interpretation means 102 for interpreting a format statement describing functions of the device 100 and setting the contents of the statement to the control content generation means 13, mode switching means 103 for making the functional description interpretation means 102 work, and display means 104 for displaying control contents of the button 12 are added to the controller 400 of the fourth embodiment.

Moreover, functional description holding means 101 in which the format statement describing functions of the device 100 are held is added to the device 100. In this case, a controlled device of the present invention corresponds to the device 100 and a controller of the present invention corresponds to the controller 400.

Operations of the fourth embodiment of a communication control system of the present invention thus constituted are described below and simultaneously, operations of a controlled device and a controller of the present invention are described.

That is, the functional description holding means 101 of the device 100 holds functions of the device 100 and their control contents and method in the form of a functional description format statement in which the control contents and method are classified into an operation rule for specifying a header and functional operation, a control attribute for specifying the attribute of a button for controlling functions, and an operation condition for functions to operate and described.

FIG. 9(A) shows the form of the format statement. The following are the functions power-on" and power-off" among the functions of the device 100 described in the form of the format statement. That is, the operation rule for power-on" shows that Functions when the button 1 is pressed. Definition of function is to set the output port 1 to logic '1'." The control attribute shows that the size of the button 1 is 7 points, the color is blue, and the icon is POWER.ICO." The operation condition shows that controllable by a body and a remote controller. When power supply is turned on, report to the controller 400." The operation rule for power-off" shows that Functions when the button 2 is pressed. Definition of function is to set the output port 1 to logic '0'." The control attribute shows that the size of the button 2 is 7 points, the color is red, and the icon is POWER2. ICO." The operation condition shows that Controllable by a body and a remote controller. When power supply is turned off, report to the controller 400." FIG. 9(B) shows the above states.

In the case of this embodiment, it is assumed that the information for specifying a communication counterpart such as the communication-counterpart address of the device 100 to be controlled by the controller 400 is already held by the memory of the controller 400 in accordance with the method described for the above embodiments. Of course, it is possible for a user or a person in charge of work to set the information by a conventional method.

Figure 10:
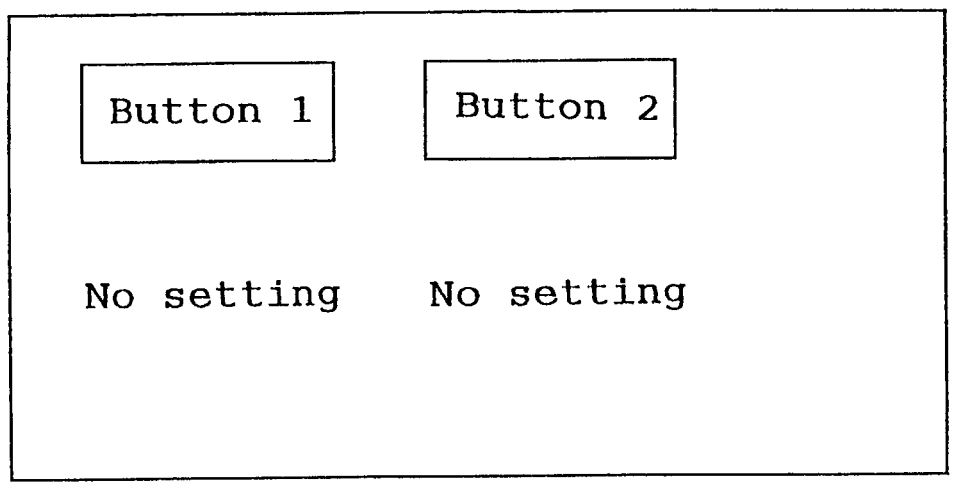
FIGS. 10(A) and 10(B) are communication flowcharts of the fourth embodiment of the present invention.
Figure 10:
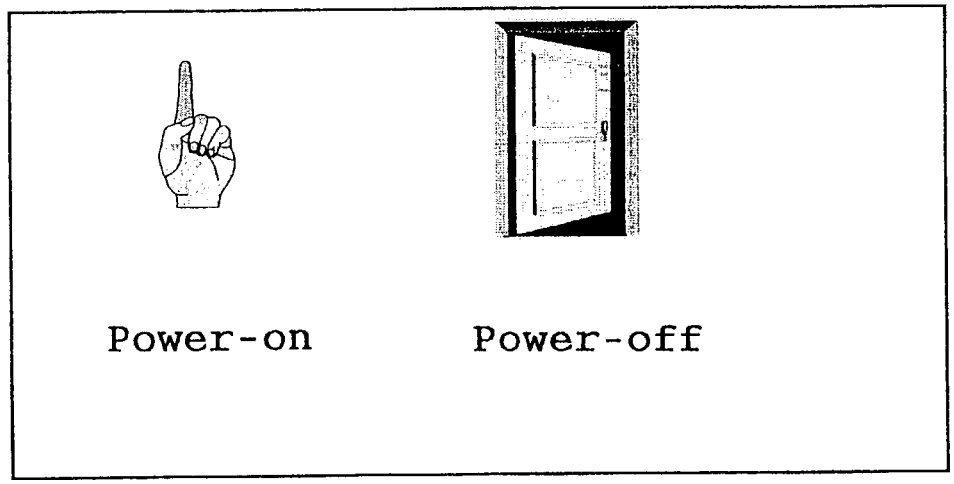

Thus, because control contents are not set to the control content generation means 13 yet when setting of a communication-counterpart address is completed, the message no setting" is displayed on the display means 104 for displaying control contents by the button 12. FIG. 10(A) shows the above state.

Therefore, the user then makes the functional description interpretation means 102 function by using the mode switching means 103 of the controller 400. The functional description interpretation means 102 sends the transmission request for the format statement of functional description previously held by the device 100 to the device 100 through the communication means 31 and communication medium 20.

When the functional description holding means 101 of the device 100 receives the transmission request through the communication means 31, it transmits the held format statement of functional description to the controller 400 through the communication means 31. The functional description interpretation means 102 of the controller 400 receives the format statement through the communication medium 20 and communication means 31, interprets the contents, and sets the contents to the control content generation means 13 and also changes the display contents of the display means 104 in accordance with the above contents. FIG. 10(B) shows the display contents after changed.

Figure 11:
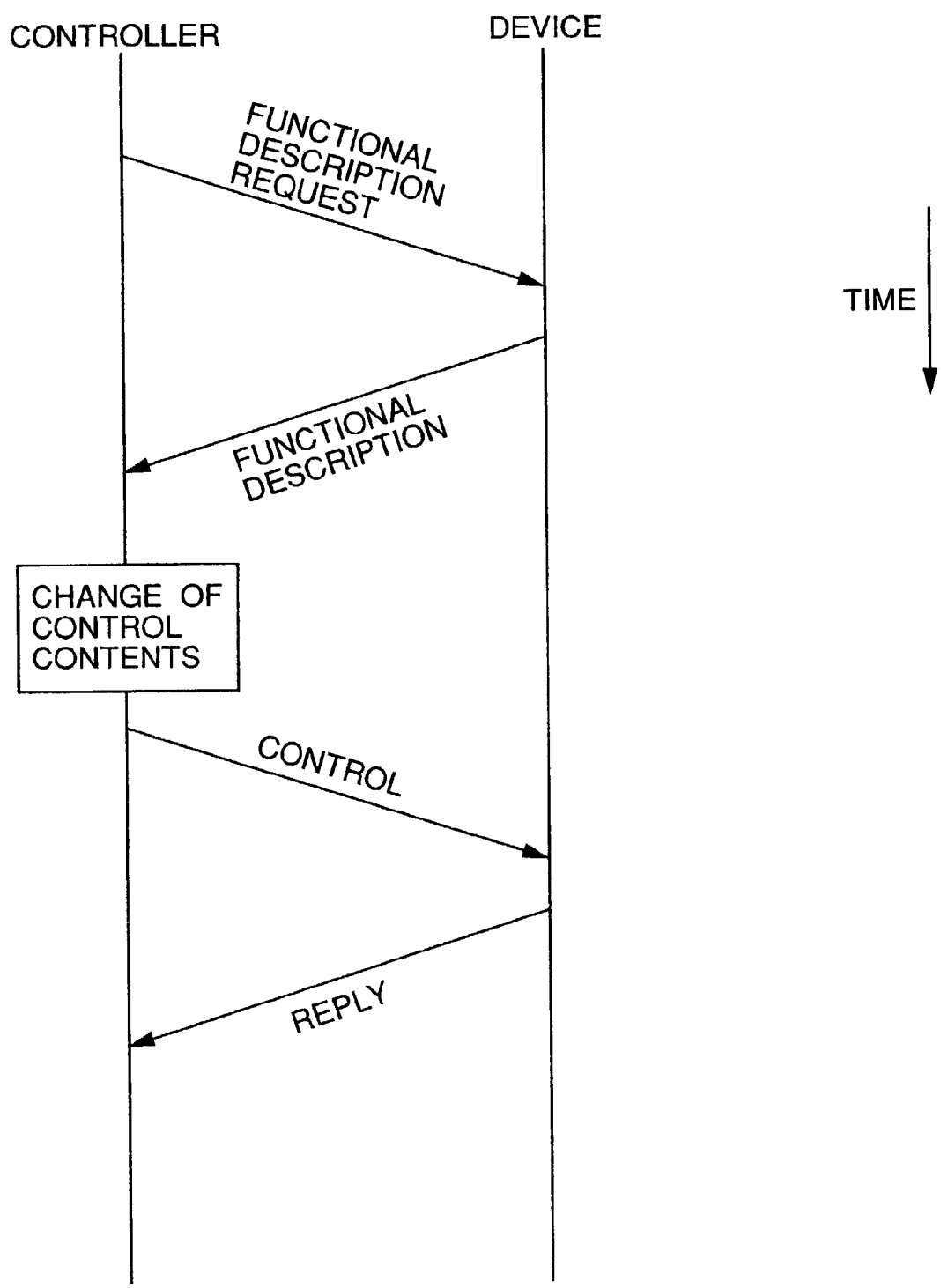
FIG. 11 is a display diagram of the fourth embodiment of the present invention.

When the button 12 of the controller 400 is pressed after set as described above, control corresponding to the fact that the button 12 is pressed is executed in accordance with the contents of the control content generation means 13. The above procedure is shown by the communication flowchart of the communication medium 20 in FIG. 11.

Therefore according to the embodiment 4, it is possible to change the control contents of the controller later even if devices are changed by describing operations of a device in the form of a functional description format statement classified into a header, operation rule for specifying functional operation, control attribute for specifying the attribute of a button for controlling functions, and operational condition for functions to operate and described, holding the format statement in the operation description-holding means of a device, transmitting the format statement to the operation description interpretation means of a controller through a communication medium, and setting the format statement to control content generation means after interpreted.

Moreover, communication media include such media as weak radio, specific small-power radio, PHS data communication, millimeter wave radio, infrared radiation in the-case of radio communication and such media as optical fiber, coaxial cable, twisted pair wire, and electric lamp wire in the case of wire communication.

(Fifth Embodiment)

Figure 12:
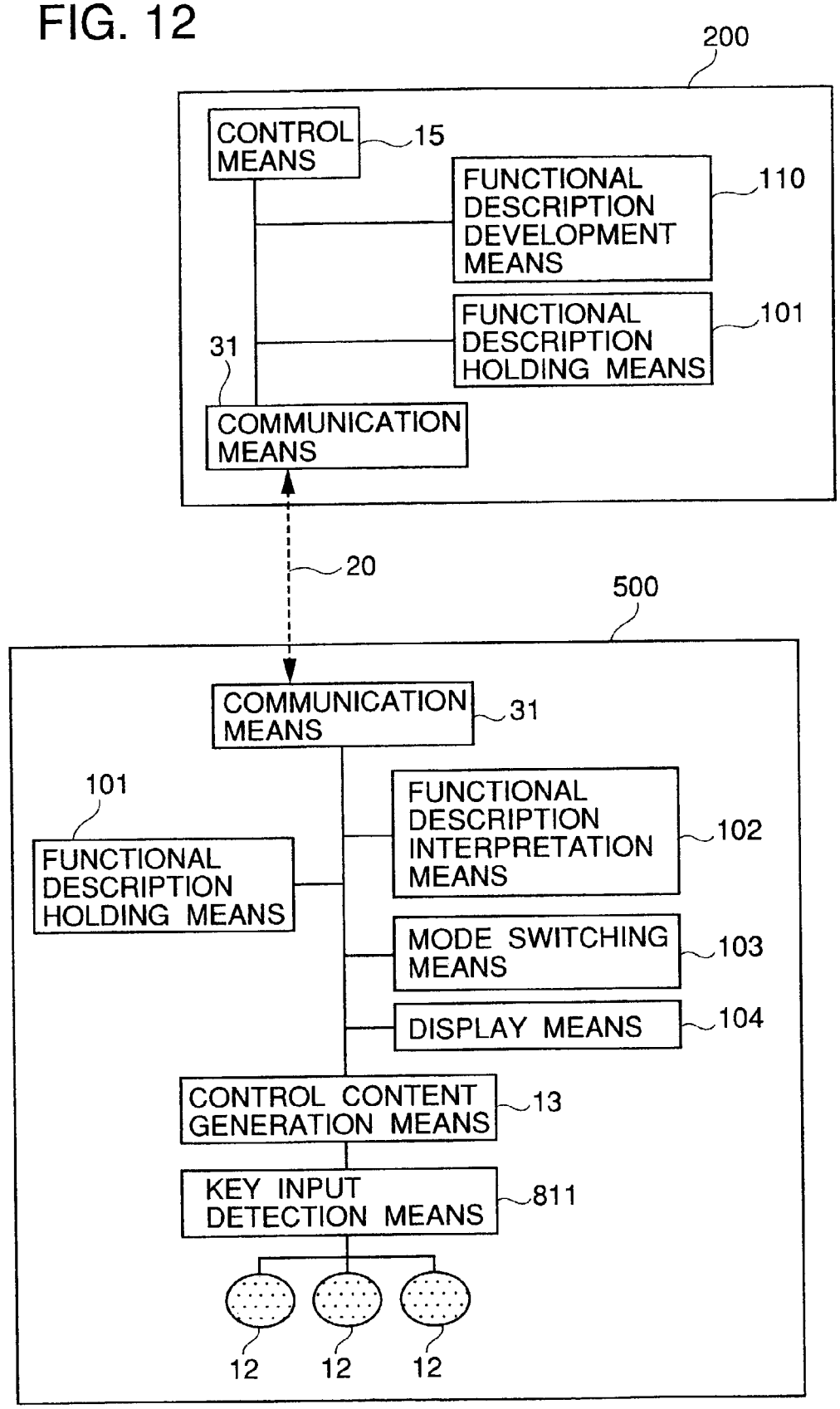
FIG. 12 is a block diagram of the communication control system of the fifth embodiment of the present invention.

FIG. 12 is a block diagram showing the communication control system of the fifth embodiment of the present invention.

For the fourth embodiment, a case is described in which control contents by a controller can be upgraded in accordance with upgrade of functions of a controlled device.

However, this embodiment purposes a controlled device whose control functions can be upgraded by upgrading the software for controlling the hardware of the device without changing hardware structures of the device. That is, in the case of this type of controlled device, by purchasing a controller having new control functions for the controller side, it is possible to upgrade the functions of the controlled device in software even if the same controlled device is used.

This embodiment is constituted by adding functional description development means 110 of the present invention to the device 200 of the fourth embodiment and the functional description holding means 101 to the controller 500 of the fourth embodiment. Therefore, in this embodiment, a component same as that of the fourth embodiment is provided with the same symbol and its description is omitted. Moreover, a component having no description is assumed to be the same as that of the fourth embodiment.

As shown in FIG. 12, the device 200 is provided with the functional description development means 110 in addition to the functional description holding means 101. The functional description development means 110 has functions for developing the functional description format statement into control functions and adding the developed functions to the control means 15.

For example, it is assumed that two types of functional description format statements such as power-on" and power-off" are held by the functional description holding means 101 of the device 200. In this case, if a format statement describing a timer function for cutting power supply 30 min later is newly added from the controller-500 side in accordance with a predetermined designation by a user, the functional description development means 110 develops the format statement into a function and adds the function to the control means 15. Moreover, as another example, to set room temperature to 25° C., it is assumed that a controller before upgraded only controls operations of the compressor of an air conditioner so that room temperature simply becomes 25° C. as the software for realizing that room temperature is set to 25° C. However, it is assumed that an upgraded controller controls not only the operations of the compressor but also the air flow in accordance with the difference between set temperature and room temperature.

In this case, by transferring the upgraded software for controlling room temperature from the controller to the air-conditioner device, it is possible to add a new function to the control means 15. Thus, only by replacing the controller with an upgraded controller, it is possible to control room temperature more comfortably though the same air-conditioner device is used.

To realize the above operation, a condition is necessary that the control means 15 originally has basic capacities for executing added functions and the operation can be realized by combining the basic capacities or, if a function is described only by software independently of hardware structure, the operation is realized by rewriting the software. Because software is generally stored in a storage medium such as a semiconductor memory or magnetic memory, the above operation can be easily realized by updating the data in the storage medium.

The above explanation is more specifically described below. That is, in the case of this embodiment, it is assumed that the following new functional description is held by the functional description holding means 101 of the upgraded controller 500. The new functional description makes it possible to execute a new control function by updating software for the above-described device 200 but it is not held by the functional description holding means 101 of the device 200 at present.

Operations of the fifth embodiment of a communication control system of the present invention thus constituted are described below and simultaneously, operations of a controlled device and a controller of the present invention are described.

A user sets the controller 500 to the functional description transfer mode by using the mode switching means 103 of the controller 500 and transfers the functional description of the functional description holding means 101 of the controller 500 to the functional description development means 110 of the device 200. The functional description is transferred from the functional description holding means 101 of the controller 500 to the functional description development means 110 through the communication means 31, the communication medium 20, and the communication means 31 of the device 200. The functional description development means 110 develops the functional description into a function and adds the function to the control means 15.

Figure 13:
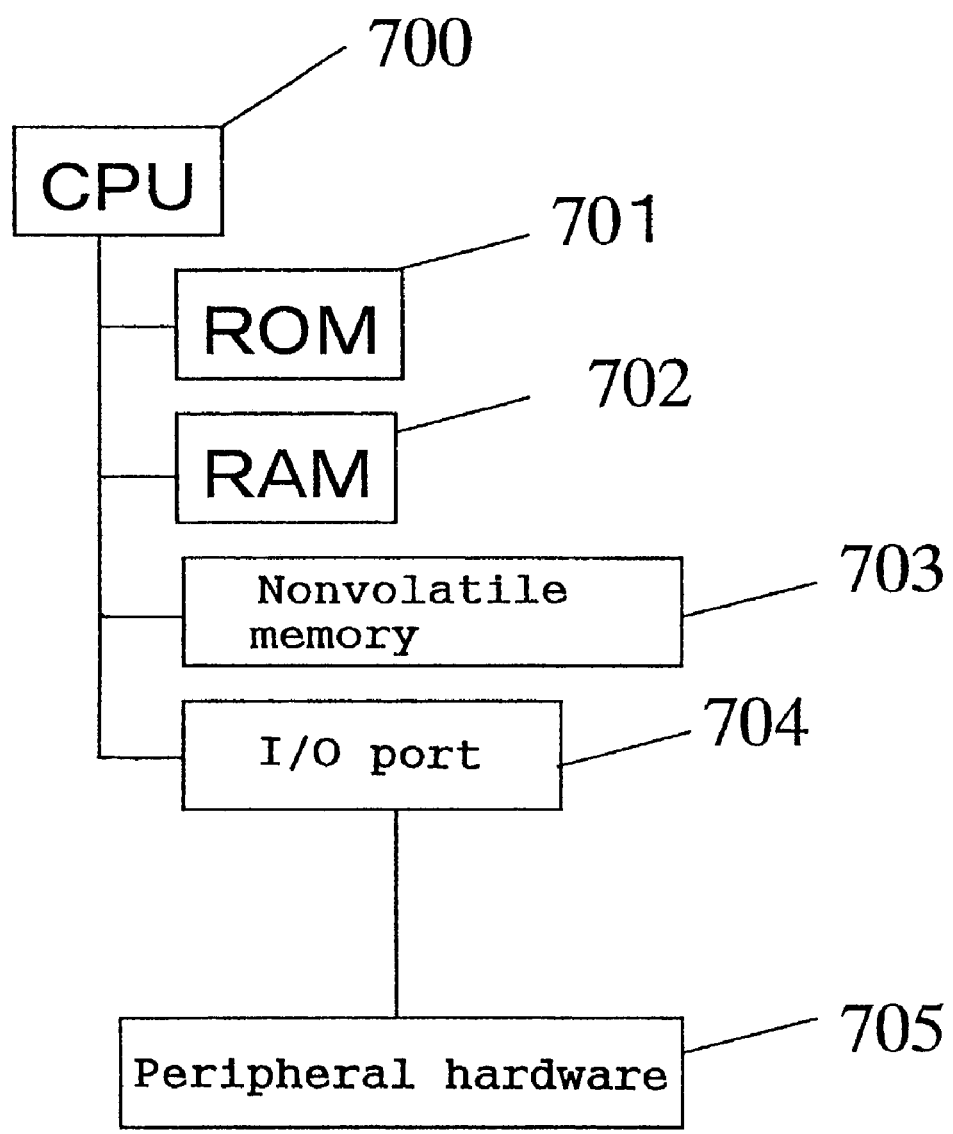
FIG. 13 is a block diagram of the fifth embodiment of the present invention.

FIG. 13 shows a specific structure for realizing the fifth embodiment. In the case of the structure shown in FIG. 13, the functional description holding means 101 of the device 200 is held by a nonvolatile memory 703, the control means 15 and functional description development means 110 are stored in a ROM 701 in the form of software, and a CPU 700 executes the means 15 and 110. The storage region and buffer region for actually executed operation results are constituted with a RAM 702. Hardware for actually realizing functions is realized by peripheral hardware 705 connected to an I/O port 704. However, by making the structure constant independently of devices, it is possible to realize a function not depending on hardware but depending on only software.

Thus, according to the embodiment 2, functions of a device can be updated by only the upgrade of version through communication without newly purchasing a device by providing functional description holding means for the controller, transferring the functional description holding means to the functional description development means provided for a device through communication, developing the functional description holding means into a function, and adding the function to control means as a new function.

As described above, the present invention has an advantage of changing control contents by changing held contents because, for example, functional description holding means for describing and holding the function of a device is used.

Moreover, the present invention has an advantage capable of uniformly describing and explaining functions because the function of a device held by the functional description holding means is described in the form of a functional description format statement which is classified into a header, an operation rule for specifying a functional operation, a control attribute for specifying the attribute of a button for controlling a function, and operational condition for a function to operate and described.

Furthermore, the present invention has an advantage making it possible to change control contents by having functional description interpretation means for interpreting and setting the above functional description.

Furthermore, the present invention has an advantage making it possible to update functions of a device by providing functional description development means for the device.

Furthermore, the present invention has an advantage making it possible to change functions of a device remotely from a controller by providing the functional description holding means for the controller and transferring the functional description held by the functional description holding means to the functional description development means of the device.

As described above, the present invention has an advantage that initialization can be simply performed compared to the conventional initialization.

Furthermore, the present invention has an advantage that a controller can easily correspond to the change of devices or a controlled device can easily correspond to the change of controllers.

In the above embodiment, a case is described in which self-address information is included in combined information of the present invention. However, instead of the self-address information, it is permitted that, for example, one of pieces of the information showing the origin and the setting state of a device is included in the combined information. Moreover, among three pieces of the information including the self-address information, it is permitted that two optional pieces or all pieces of the information are included. In this case, it is necessary for the information showing the origin of a device to include the manufacturer's name of the device, type of the device (e.g. air conditioner, lighting equipment, or television), serial number of the device (manufacturing number), model name (product name) of the device, and functions of the device (e.g. in the case of an air conditioner, cooling, heating, and dehumidifying functions). Moreover, it is necessary for the information showing the setting state of a device to include the owner of the device (e.g. elder-brother's personal computer or younger-brother's CD player), setting place of the device (e.g. kitchen, living room, or bedroom), setting area of the device (e.g. the area of a room in which an air conditioner is set), and nickname of the device (e.g. air conditioner No. 1, air conditioner No. 2, or Mr. or Ms. XX' personal computer). Furthermore, it is necessary for the information showing the origin of a device and the information showing the setting state of a device to include a house code respectively.

Each element in all of the above-described embodiments may be implemented in software or in dedicated hardware.

Obviously, the operation of each step or means described in any of the above embodiments can be carried out by preparing and using a recording medium on which a program to cause a computer to execute all or part of each step or means described in any of the above embodiments is recoeded.

What is claimed is:

1. A communication control system comprising a controlled device to be controlled and a controller for controlling said controlled device through a communication medium, wherein said controlled device is provided with first functional-information holding means for holding functional information for said controlled device, and requested functional information is transmitted to said controller in accordance with a request for transmitting said held functional information when the request is sent to said controlled device wherein said controller includes an external function controlling device for controlling a function of said controlled device, the external function controlling device having control attributes indicative of the function of said controlled device and defined by said functional information.

2. The communication control system according to claim 1, wherein said controller is provided with communication means for performing the communication with said controlled device, a button for controlling said controlled device through said communication, control content generation means for generating control contents corresponding to said button, and functional description interpretation means for setting said control contents in with accordance with the interpretation of said functional information.

3. The communication control system according to claim 2, wherein said function description interpretation means obtains said functional information held by said functional description holding means of a device through said communication means.

4. A medium wherein a program for making a computer execute functions of means of claim 1 is recorded.

5. The communication control system according to claim 1, wherein the external function control device is a manual switching device.

6. A communication control system comprising a controlled device to be controlled and a controller for controlling said controlled device through a communication medium, wherein said controlled device is provided with first functional-information holding means for holding the functional information for said controlled device, requested function information is transmitted to said controller in accordance with a request for transmitting said held functional information when the request is sent to said controlled device, and said functional information is described in the form of a functional description format statement in which said functional information is described by being classified into a header, an operation rule for specifying the operation of the function of said controlled device, a control attribute for specifying the attribute of a button for controlling said function, and an operational condition for said function to operate.

7. A medium wherein a program for making a computer execute functions of means of claim 6 is recorded.

8. A communication control system comprising a controlled device to be controlled and a controller for controlling said controlled device through a communication medium, wherein said controlled device is provided with first functional-information holding means for holding the functional information for said controlled device, requested function information is transmitted to said controller in accordance with a request for transmitting said held functional information when the request is sent to said controlled device, and said controlled device is provided with functional information development means for developing functional information transferred from an external unit into functions and adding the functions as those of said controlled device.

9. The communication control system according to claim 8, wherein the functional information transmitted from said external unit is stored in second functional-information holding means provided for said controller.

10. A medium wherein a program for making a computer execute functions of means of claim 8 is recorded.

* * * * *